US009037790B2

(12) United States Patent
Jaquette et al.

(10) Patent No.: US 9,037,790 B2
(45) Date of Patent: May 19, 2015

(54) SYSTEMS, METHODS, AND COMPUTER PROGRAM PRODUCTS FOR PROVIDING HIGH AVAILABILITY METADATA ABOUT DATA

(75) Inventors: Glen A. Jaquette, Tucson, AZ (US); Leonard G. Jesionowski, Tucson, AZ (US); Wolfgang Mueller-Friedt, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/718,629

(22) Filed: Mar. 5, 2010

(65) Prior Publication Data

US 2011/0219184 A1     Sep. 8, 2011

(51) Int. Cl.
*G06F 12/02* (2006.01)
*G11B 27/11* (2006.01)
*G06F 3/06* (2006.01)
*G11B 27/00* (2006.01)
(Continued)

(52) U.S. Cl.
CPC .......... *G11B 27/11* (2013.01); *G06F 17/30864* (2013.01); *G06F 3/0638* (2013.01); *G06F 3/0682* (2013.01); *G06F 3/061* (2013.01); *G11B 27/002* (2013.01); *G11B 27/329* (2013.01); *G11B 2220/40* (2013.01); *G11B 2220/655* (2013.01); *G11B 2220/90* (2013.01)

(58) Field of Classification Search
USPC ....... 711/4, 100, 111, 115; 707/758, E17.061
See application file for complete search history.

(56) References Cited

U.S. PATENT DOCUMENTS 6,100,788 A * 8/2000 Frary ........................... 340/10.1
6,304,716 B1   10/2001 Hanai et al.
(Continued)

FOREIGN PATENT DOCUMENTS

EP    1 605 462 A1   12/2005
WO    2006/090325 A2   8/2006

OTHER PUBLICATIONS

"IBM Integrated Removable Media Manager for the Enterprise on System z V1.1 provides automated tape media management for datacenters", Aug. 7, 2007, International Business Machines Corporation. Retreived on Dec. 17, 2011 from <http://www-01.ibm.com/common/ssi/rep_ca/4/897/ENUS207-174/ENUS207174.PDF>.*
(Continued)

*Primary Examiner* — Arpan P. Savla
(74) *Attorney, Agent, or Firm* — Zilka-Kotab, PC

(57) ABSTRACT

In one embodiment, a method includes receiving metadata corresponding to data on a removable storage device/medium, storing the metadata to a metadata repository that is not on the removable storage device/medium, associating an identifier with the stored metadata (the identifier corresponding to the removable storage medium/device), and storing the identifier to the metadata repository. According to another embodiment, a computer program product includes a computer readable storage medium having computer readable program code embodied therewith. The computer readable program code comprises computer readable program code configured to: receive metadata corresponding to data on a removable storage device/medium, store the metadata to a metadata repository, associate an identifier corresponding to the removable storage device/medium with the stored metadata, and store the identifier to the metadata repository. Other methods, systems, and devices are presented as well.

24 Claims, 4 Drawing Sheets

(51) Int. Cl.
*G11B 27/32* (2006.01)
*G06F 17/30* (2006.01)

(56) References Cited

U.S. PATENT DOCUMENTS

| | | | |
|---|---|---|---|
| 6,675,257 B1* | 1/2004 | Khalid et al. | 711/111 |
| 6,710,786 B1 | 3/2004 | Jacobs et al. | 5/744 |
| 6,772,125 B2* | 8/2004 | Harradine et al. | 704/278 |
| 7,158,974 B2 | 1/2007 | Williams et al. | 707/10 |
| 2003/0035644 A1 | 2/2003 | Nakano et al. | |
| 2004/0073620 A1* | 4/2004 | Roh et al. | 709/208 |
| 2005/0162770 A1 | 7/2005 | Yanagita et al. | |
| 2006/0041830 A1 | 2/2006 | Bohn | 715/501.1 |
| 2006/0041871 A1 | 2/2006 | Friedman et al. | 717/136 |
| 2006/0059192 A1 | 3/2006 | Chun et al. | |
| 2007/0039014 A1* | 2/2007 | Pierce et al. | 720/630 |
| 2007/0208711 A1 | 9/2007 | Rhoads et al. | 707/3 |
| 2008/0065699 A1 | 3/2008 | Bloebaum et al. | 707/200 |
| 2008/0109460 A1 | 5/2008 | Chun et al. | 707/100 |
| 2008/0168108 A1* | 7/2008 | Molaro et al. | 707/202 |
| 2008/0281836 A1 | 11/2008 | Dykstra-Erickson et al. | 707/100 |
| 2009/0019357 A1 | 1/2009 | Cudich et al. | 715/234 |
| 2009/0106261 A1 | 4/2009 | Nagasaka et al. | |
| 2009/0182750 A1 | 7/2009 | Keyes et al. | 707/10 |
| 2009/0207998 A1 | 8/2009 | Wall et al. | |

OTHER PUBLICATIONS

Ternier et al., "The Ariadne Infrastructure for Managing and Storing Metadata" Emerging E-Learning Technologies, IEEE, Jul./Aug. 2009, p. 18-25.

Wedde et al., "A Universal Framework for Managing Metadata in the Distributed Dragon Slayer System", IEEE, 2000, p. 96-101.

International Search Report and Written Opinion from PCT Application No. PCT/EP2011/052716 dated May 24, 2011.

* cited by examiner

SYSTEMS, METHODS, AND COMPUTER PROGRAM PRODUCTS FOR PROVIDING HIGH AVAILABILITY METADATA ABOUT DATA

BACKGROUND

Removable media, such as hard disk drives, tape cartridges, optical drives, etc., are used to store data, particularly when a large amount of data is to be stored and low costs are desired. However, it can be overly time consuming to identify what is present on a particular removable medium by mounting the medium and reading it. This is especially true when thousands of removable media are used to store data. Therefore, there is a need in the art of removable media mass storage to provide metadata about what data is stored on each removable medium. Such a solution would be especially useful in many different applications, especially those involving video files, e.g. Digital Video Surveillance (DVS), broadcast studios (e.g. Fox, CBS, ABC, etc.), film studies which create digital film (e.g. whether shot directly into a digital format, or by conversion of previously shot analog clips to digital, etc.), and for editing any digital formats, especially by small independent contractors. However, attempts at such a solution have failed to provide an efficient and useful system.

For example, in one existing solution, a Quantum MXF-aware drive apparently extracts a list of all the files being written to a tape cartridge in MXF format and stores this list to the cartridge in some special way, and there are multiple versions of this storage. In the linear-tape open (LTO) version, the list is most likely stored in a HouseKeeping DataSet (HKDS). In this way, a file list has been created to manage the data that is stored to a tape cartridge. In this list, for each file, not only the file name is available, but also other metadata associated with that file (e.g. if it was a digital film clip, perhaps the other metadata includes the timecode, the digital film format, location shot, camera number, clip length, etc.). The file list is accessed when a tape cartridge is mounted. There is an agent on the host which puts all the files into a window. Then, the user on the host can simply select which files are desired on the tape cartridge, and then drag them to another window to indicate that these files are to be pulled off tape and put on a disk somewhere—typically so that the files may be edited.

However, there is still a need for easily and quickly accessing metadata which corresponds to data on the individual removable media, such as tape cartridges, to quickly identify what data is stored to the individual removable media without needing to access the individual removable media itself.

SUMMARY

In one embodiment, a method includes receiving metadata corresponding to data on a removable storage device or data on a removable storage medium, storing the metadata to a metadata repository that is external to the removable storage device or the removable storage medium, associating an identifier with the stored metadata (the identifier corresponding to the removable storage medium or the removable storage device), and storing the identifier to the metadata repository.

In another embodiment, a computer program product includes a computer readable storage medium having computer readable program code embodied therewith. The computer readable program code comprises computer readable program code configured to: receive metadata corresponding to data on a removable storage device or data on a removable storage medium; store the metadata to a metadata repository; associate an identifier with the stored metadata, the identifier corresponding to the removable storage device or the removable storage medium; and store the identifier to the metadata repository.

According to another general embodiment, a system includes a processor for: receiving a request for metadata associated with an identifier (the metadata corresponding to data on a removable storage device or data on a removable storage medium and the identifier corresponding to the removable storage device or the removable storage medium), accessing a metadata repository, searching the metadata repository for the metadata associated with the identifier, and outputting the metadata associated with the identifier.

In yet another embodiment, a method includes receiving an identifier of a removable storage device or a removable storage medium, sending a request for metadata associated with the identifier to a remotely accessible metadata repository, and receiving the metadata associated with the identifier, wherein the metadata corresponds to data on the removable storage device or data on the removable storage medium.

A magnetic tape cartridge, according to another embodiment, comprises a magnetic tape for storing data, data stored to the magnetic tape, and an identifier stored on or coupled to the magnetic tape, wherein the identifier is associated with metadata stored in a metadata repository which corresponds to the data stored to the magnetic tape.

A method according to yet another embodiment includes storing to a repository index information corresponding to data on a removable storage device or data on a removable storage medium, the repository being external to the removable storage device or the removable storage medium; receiving updated index information; storing the updated index information to the repository; and sending the index information or derivative thereof as an index to the removable storage device or the removable storage medium for storage of the index on the removable storage device or the removable storage medium.

Other aspects and embodiments of the present invention will become apparent from the following detailed description, which, when taken in conjunction with the drawings, illustrate by way of example the principles of the invention.

DETAILED DESCRIPTION

Figure 1:
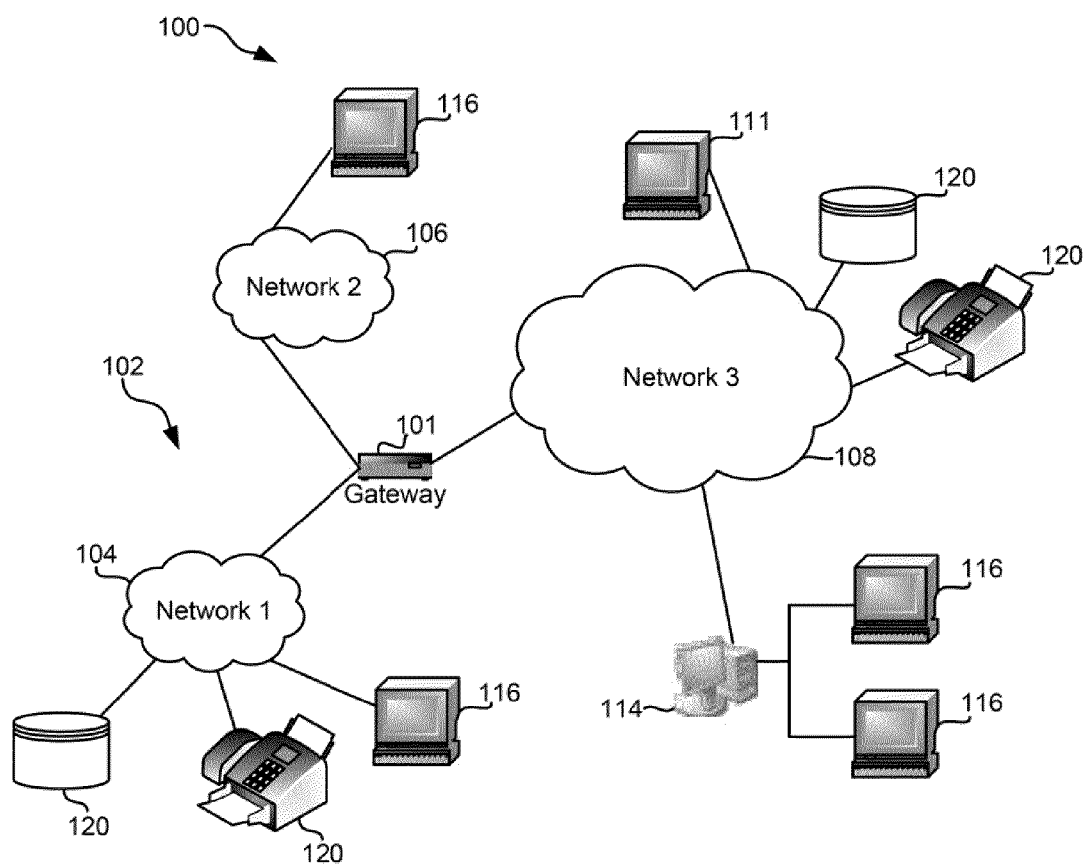
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method includes receiving metadata corresponding to data on a removable storage device or data on a removable storage medium; storing the metadata to a metadata repository that is external to the removable storage device or the removable storage medium; associating an identifier with the stored metadata, the identifier corresponding to the removable storage medium or the removable storage device; and storing the identifier to the metadata repository.

In another general embodiment, a computer program product includes a computer readable storage medium having computer readable program code embodied therewith. The computer readable program code comprises computer readable program code configured to: receive metadata corresponding to data on a removable storage device or data on a removable storage medium; store the metadata to a metadata repository; associate an identifier with the stored metadata, the identifier corresponding to the removable storage device or the removable storage medium; and store the identifier to the metadata repository.

According to another general embodiment, a system includes a processor for: receiving a request for metadata associated with an identifier, the metadata corresponding to data on a removable storage device or data on a removable storage medium and the identifier corresponding to the removable storage device or the removable storage medium; accessing a metadata repository; searching the metadata repository for the metadata associated with the identifier; and outputting the metadata associated with the identifier.

In yet another general embodiment, a method includes receiving an identifier of a removable storage device or a removable storage medium; sending a request for metadata associated with the identifier to a remotely accessible metadata repository; and receiving the metadata associated with the identifier, wherein the metadata corresponds to data on the removable storage device or data on the removable storage medium.

A magnetic tape cartridge, according to a general embodiment, comprises a magnetic tape for storing data; data stored to the magnetic tape; and an identifier stored on or coupled to the magnetic tape, wherein the identifier is associated with metadata stored in a metadata repository which corresponds to the data stored to the magnetic tape.

A method in one general embodiment includes storing to a repository index information corresponding to data on a removable storage device or data on a removable storage medium, the repository being external to the removable storage device or the removable storage medium; receiving updated index information; storing the updated index information to the repository; and sending the index information or derivative thereof as an index to the removable storage device or the removable storage medium for storage of the index on the removable storage device or the removable storage medium.

As will be appreciated by one skilled in the art, the present invention may be embodied as a system, method, or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
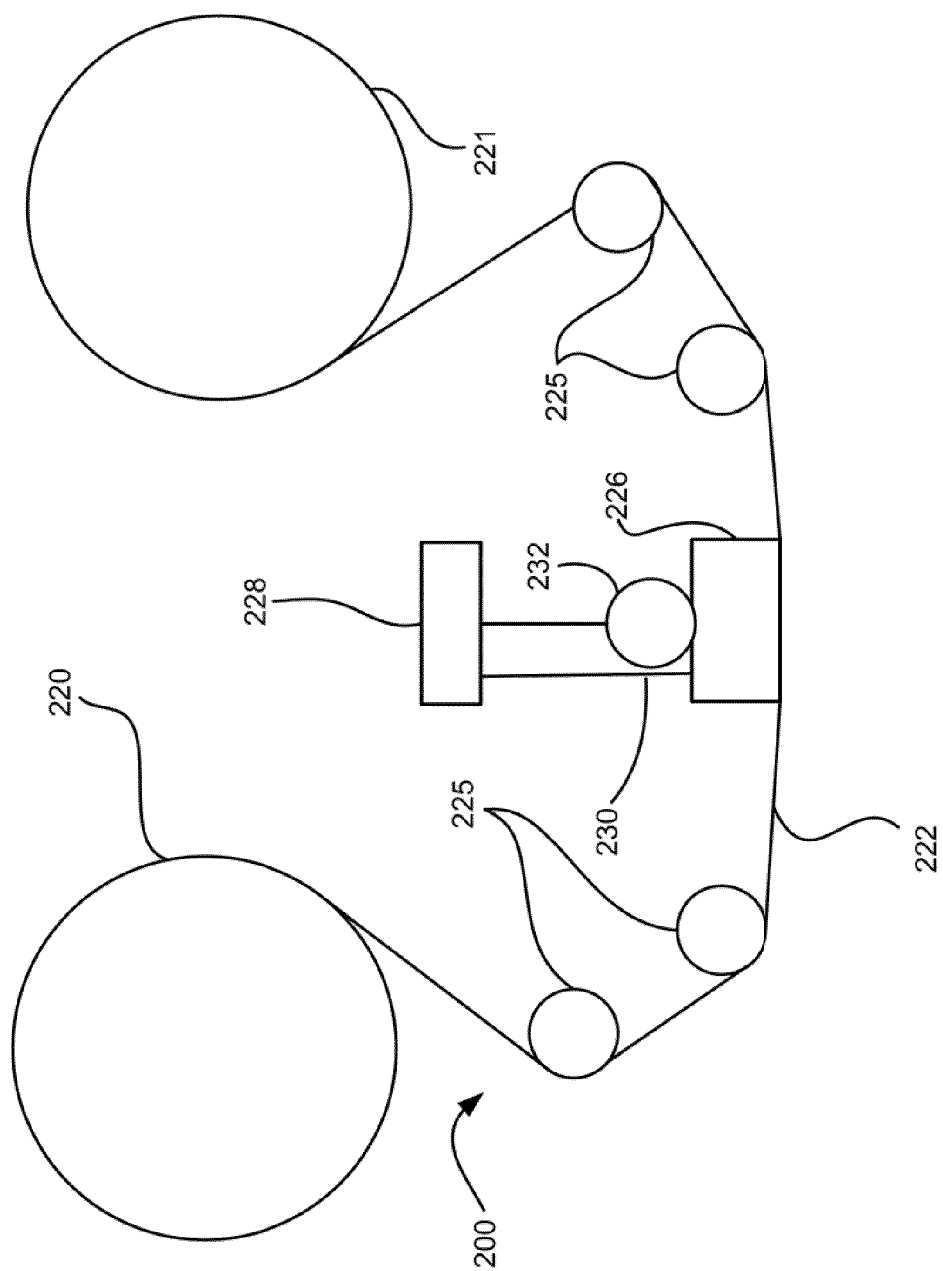
FIG. 2 is a schematic of tape drive system, in accordance with one embodiment.

FIG. 2 is a schematic diagram of a simplified tape drive system, in accordance with one embodiment, which may be a standalone unit, part of a tape library system, a peripheral 120 of FIG. 1, etc. Such a tape drive may be employed in the context of an embodiment of the present invention. While one specific implementation of a tape drive is shown in FIG. 2, it should be noted that the embodiments of the previous figures may be implemented in the context of any type of tape drive system.

As shown, a tape supply cartridge 220 and a take-up reel 221 are provided to support a tape 222. These may form part of a removable cassette and are not necessarily part of the system. Guides 225 guide the tape 222 across a preferably bidirectional tape head 226. Such tape head 226 may be a MR, GMR, TMR, spin-valve, or other type. Tape head 226 is in turn coupled to a controller assembly 228 via a connector cable 230. The controller 228, in turn, controls head functions such as servo following, write bursts, read functions, etc. An actuator 232 controls position of the head 226 relative to the tape 222.

A tape drive, such as that illustrated in FIG. 2, includes drive motor(s) to drive the tape supply cartridge 220 and the take-up reel 221 to move the tape 222 linearly over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art.

Although the methods, systems, and devices disclosed herein are equally applicable to any type of removable medium, for simplicity, the remainder of the descriptions will refer to tape cartridges as the removable media. However, these descriptions are not meant to be limiting, and any type of removable media may be used, such as hard disk drives, optical drives, etc.

Recently, it has been proposed to add a significant amount of silicon memory to tape cartridges to store metadata therein, thereby allowing for quick access to information about the data stored on the tape cartridge. There is already a Cartridge Memory, but it is both small (8 KB) and very slow. These other proposals involve faster and bigger memory (e.g. SSD, Flash, SD chip, etc.). One application envisioned for such a memory is as a way to allow access to the metadata about the data on the tape cartridge without requiring a drive. There are several problems with the concept of putting a block of memory into a tape cartridge. First, each tape cartridge that has a memory block is somewhat more expensive to manufacture. For example, even if the memory block is an SD card, each SD card costs about $5, so that is still cost inhibiting, because manufacturing costs of a typical tape cartridge today is less than about $20, so an additional $5 is greater than 25% of the manufacturing costs of the tape cartridge. In addition, each tape cartridge with a memory block requires that this memory block be readable by whatever device is integrated with the tape drives typically used with the tape cartridges. A memory block could potentially be connected to the tape cartridge in one of two ways. A first way is by contacts, and having debris (which occurs in tape automations, just due to wear) or oxidation make the contacts unreliable. If a USB connector is used (as has been proposed), it could become obstructed due to accumulated debris, thereby making the memory block inaccessible. A second way is contactless, and this typically severely limits the bandwidth available for transferring data. As an example, it can take several seconds to fully read an 8 KB cartridge memory (CM). If there is any significant amount of metadata, this can take far too long (e.g. if the transfer is at 2 KB/s, then 100 MB would take about 50,000 sec, which is about 14 hours). Also, if the metadata is not in a database, and access to the metadata is contingent on reading the memory block, then the tape cartridge must be accessed to read the memory block. There could be 20,000+ tape cartridges in a HD 3584 library (without passthrough). It could take a very long time to gather all the metadata (e.g. 20,000×10 seconds/cartridge=200,000 seconds=55 hours), even if it was in such a library.

However, the cartridges may be on shelves, in storage, or even in a secure location such as a salt mine. In these circumstances, all of the tape cartridges would need to be analyzed (possibly by using a bar code reading device passed across a bar code on each tape cartridge). This could take a prohibitively long time to perform. With the memory block embedded with each tape cartridge, the metadata of the tape cartridge that is currently possessed must be accessed, and a search against all tape cartridges cannot be easily performed. Another concept which exists in the prior art is the concept of using a uniform resource locator (URL) as a pointer to access a linked element. Specifically, a URL of a secret code can be stored which is used to decrypt an encrypted tape cartridge. This process is disclosed in IEEE P1619.3.

According to one embodiment, metadata about data on a tape cartridge is stored in a computer readable memory, and an identifier (such as a pointer, URL that is linked to the metadata, network address, etc.) is stored to the tape cartridge or magnetic tape. In one preferred embodiment, a remotely accessible database is used to store the metadata and is accessible by the URL stored to the CM of the tape cartridge, thereby providing a better solution in multiple respects, such as higher availability, better performance, less expense to implement, etc.

In one approach, an Integrated Removable Media Manager, or iRMM, sold by International Business Machines Corporation having a corporate office at New Orchard Road, Armonk, N.Y. 10504-1722, United States of America, may be used as the remotely accessible database, which includes a database that includes metadata about data on tape cartridges and about the tape cartridges themselves. iRMM keeps this metadata not only about tape cartridges in various automations, but also about any tape cartridge it has ever seen, unless the information associated with a tape cartridge is deleted. So iRMM has metadata about tape cartridges that are exported and put on a shelf (or anywhere else, such as in a salt mine), or sent to another location (such as a collaborator, business partner, etc.). Typically, iRMM collects a well known set of metadata, and all the metadata is based on the data container (i.e. the tape cartridge) and various measures of health and usage of the data container. However, the data itself is generally not reported in the metadata in iRMM. But iRMM uses a DB/2 database, and that database usage could easily be extended to cover any additional metadata to be stored, including metadata about the data on the tape cartridge itself.

In some embodiments, the metadata stored to the remotely accessible database may include any type of metadata relating to the data on the tape cartridge, for example changes to the data an a tape cartridge, including names of any files stored to that cartridge, date of last change, date of last access, etc. Any useful information about the data stored on the tape cartridge may be included in the metadata stored to the remotely accessible database.

In more approaches, the URL may store an address which points to a network address (such as a WWW address) of the remotely accessible database, such as a iRMM database, that has this metadata stored therein, along with a number which points to the specific tape cartridge where the data is stored. For example, the network address may be: www.ibm.com/tucson2/bldg90/irmm_domain_2/C639B063A4E34088AE93201B34DC5 749. In one approach, this network address may be stored in a CM (e.g. in the Application Specific CM page, in a table of addresses, etc.), in another location, or in multiple locations on the tape (in case of CM failure). Note that all CM pages are written with the end of data (EOD) dataset. The CM contents could also be written to HKDS datasets. Through this technique, the metadata is resiliently stored. Any type of CM may be used, including those known in the art. Illustrative types of CMs include radio frequency identification (RFID) and other wireless-type CMs, flash memory CMs, etc.

By using this method, the remotely accessible database may be accessed in order to retrieve or store the information associated with the tape cartridge. Note that in the example, the final field in the URL is specified as an 8 byte, 16 byte, 32 byte, etc., pseudo-random field expressed in hexadecimal. For this example, assume a 16 byte pseudo-random field is used. Note that the intention is that this 16 byte pseudo-random field is unique for each tape cartridge, so after a candidate 16 byte random number is created, say for a new tape cartridge, it could be verified to be unique, because it becomes problematic if the 16 byte random number has been allocated to any other tape cartridge with metadata stored in the remotely accessible database. That would create a "collision" situation. In other cases, embodiments sometimes rely on the very high probability of uniqueness if a relatively small set of numbers are long, randomly generated numbers. If the number is truly long and randomly generated, the probability of collision is sometimes considered to be so miniscule as to be acceptable. After a tape cartridge image is created, knowing which 16 byte value is associated with the tape cartridge is determined easily if the data is being read from this tape cartridge (e.g. with a CM reader), which can be accomplished if the tape cartridge is in the user's possession. Otherwise, the 16 byte value may not be known to the user, and therefore the user may not be able to access the metadata stored to the remotely accessible database associated with this tape cartridge.

In addition, if the identifier is in possession of the user, all of the metadata associated with the tape cartridge is available to the user as well. So, knowing the identifier may, in some approaches, be all that is needed to get the metadata associated with the tape cartridge. Note that going to a subset of the URL, for example www.ibm.com/tucson2/bldg90/irmm_domain_2, could reveal several items. For example, a list of all cartridges this remotely accessible database includes (which is to say there is no access control at all, and if one subset address is known, then any of the subset addresses associated with metadata for any tape cartridge). In another example, it may not provide a list of all cartridges, which is to say a user may need to know the exact 16 byte pseudo-random extension or the metadata associated with the cartridge is not accessible. This is similar to requiring a 128-bit authentication key. If a user has physical possession of the tape cartridge, and therefore knows the 128-bit key, then the user is entitled to the metadata about that tape cartridge in the remotely accessible database.

In one approach, that same metadata, which is in the remotely accessible database, may be written to a second partition on the associated tape cartridge. Note that if the partition on the physical tape cartridge is not encrypted (which is typically the case), then there is no security for the metadata, e.g. if the tape cartridge is in possession of the user, then the user is entitled to read the tape cartridge. Accordingly, the user in possession of the tape cartridge may be entitled to the metadata about the tape cartridge and the data on the tape cartridge, and it does not matter to anyone whether it is read from the tape cartridge (the standard approach), or the network connected to a remotely accessible database. If security of the metadata is a priority, any suitable option may be used to accomplish this security. For example, the user may be required to authenticate via some other method, such as by entering a user ID and password, by satisfying a previously setup doubly authenticated SSL or IPsec link, etc.

In short, access to the metadata in the remotely accessible database may be made available over a network connection, such as the Internet. And depending on how access to that database is controlled, as much, or as little, security can be provided as is desired to gain access to that metadata.

According to one example, where the iRMM database is used as the remotely accessible database, there are numerous advantages over incorporating a memory block to the tape cartridge. One advantage is that the iRMM database is very resiliently available (e.g. it may have multiple copies, such as highly available (HA) and data recovery (DR) copies). Another advantage is that it may be networked to, and in the rare case of a network outage, a tape drive may read the second partition, so that metadata may be remotely read. Also, a search may be performed on all metadata for all tape cartridges (e.g. search for a film clip in a library of 100,000+ tape cartridges, most of which are on shelves) without accessing each tape cartridge individually.

Figure 3:
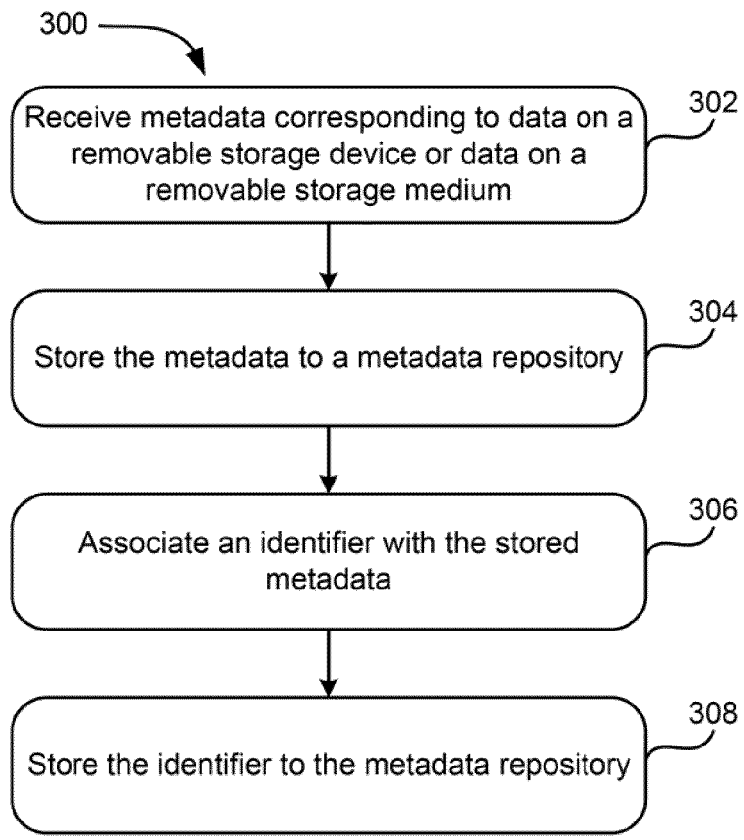
FIG. 3 is a flowchart of a method, according to one embodiment.

Now referring to FIG. 3, according to some embodiments, a method 300 for managing removable media is shown. The method 300 may be performed in any desired environment, and may include more operations than those described below. In addition, the method 300 may be executed by a computer system, network device, etc.

In operation 302, metadata corresponding to data on a removable storage device or data on a removable storage medium is received. The metadata may be sent by any device, input by a user, transferred across a network, etc.

In a preferred embodiment, the removable storage device may be a magnetic tape cartridge which includes magnetic tape having data stored thereon. The magnetic tape cartridge is preferably readable by a magnetic tape drive.

In some approaches, the metadata also corresponds to the removable storage device and/or the removable storage medium. Typically, one or the other will be used. For example, in a system which includes hard disk drives (HDDs) as storage devices, the hard disk itself is the storage medium, but is not necessarily removable, since it is housed in a HDD having a spindle coupled to the hard disk. In another example, in a system which primarily uses magnetic tape as the storage medium, the magnetic tape cartridges are the removable storage devices. Any type of removable storage devices and/or media may be used.

In operation 304, the metadata is stored to a metadata repository. The metadata repository is external to the removable storage device or the removable storage medium. For example, it is not stored on the removable storage device or the removable storage medium. Rather, the metadata repository may reside on or be coupled to a remote server, remote database, etc. Moreover, the metadata repository may be remotely accessible, and in one approach may include an iRMM database or the like.

In operation 306, an identifier is associated with the stored metadata. The identifier corresponds to the removable storage medium or the removable storage device. For example, the identifier may be assigned to metadata that corresponds to data on a magnetic tape of a tape cartridge. In this way, anyone who is searching for information about the tape cartridge can then access the metadata by simply knowing the identifier.

In further approaches, the identifier may be stored on or coupled to the removable storage medium and/or the removable storage device. For example, if the identifier is a numerical code, it may be printed on a label which is adhered to the magnetic tape cartridge, exterior surface of a HDD, etc., and may be read by a user. In another example, if the identifier is a bar code, it may be coupled to an accessible portion of a magnetic tape cartridge, HDD, optical drive, etc., and may be accessed and read by a bar code scanner. Moreover, if the identifier is an RFID tag, it may be placed anywhere in or around the HDD, tape cartridge, etc., and may be accessed and read by use of an RFID scanner.

In some embodiments, the identifier may include a code, such as a numeric code, an alphabetic code, an alphanumeric code, etc. For example, if a removable storage device includes data from building 6 of company XYZ's San Francisco facility, the identifier may include a building designation, B6, along with a company designation, XYZ, and a location identifier SF, with or without a further number designating a tape number, such as 0001 e.g. XYZSFB60001. In a further embodiment, the code may be randomly generated. In the prior example, the 0001 portion may be randomly generated, the whole identifier randomly generated, only a portion randomly generated, etc.

In operation 308, the identifier is stored to the metadata repository. In this way, the metadata repository may be updated whenever any changes occur to the data corresponding to the identifier to reflect those changes.

In one embodiment using a randomly generated identifier, it may be verified that the identifier is unique and not assigned to another removable storage medium or removable storage device before associating the identifier to the stored metadata and storing the identifier to the metadata repository.

After the metadata has been stored to the metadata repository, in some approaches, the metadata repository may be accessed to determine which data is stored on the removable storage medium.

According to another embodiment, a computer program product includes a computer readable storage medium having computer readable program code embodied therewith. The computer readable program code is configured to receive metadata corresponding to data on a removable storage device or data on a removable storage medium, store the metadata to a metadata repository, associate an identifier with the stored metadata, the identifier corresponding to the removable storage device or the removable storage medium, and store the identifier to the metadata repository.

In a preferred embodiment, the removable storage device may be a magnetic tape cartridge which includes magnetic tape having data stored thereon. The magnetic tape cartridge is preferably readable by a magnetic tape drive.

In another embodiment, a system may include some or all of the functionality previously described. For example, the system may include a processor. The processor may be configured to receive a request for metadata associated with an identifier, the metadata corresponding to data on a removable storage device or data on a removable storage medium and the identifier corresponding to the removable storage device or the removable storage medium; access a metadata repository; search the metadata repository for the metadata associated with the identifier; and output the metadata associated with the identifier.

Outputting may include, but is not limited to, printing, displaying, storing, copying, transferring, etc., any or all portions of the metadata associated with the identifier received. Receiving may include a user inputting the identifier, another system sending the identifier to the system receiving it, a scanning device (such as a bar code reader, an RFID scanner, etc.) transferring the identifier to the system, etc.

In some approaches, the metadata may also correspond to the removable storage device or the removable storage medium. Particularly, the metadata may perform two functions. One is to provide information relating to the removable storage device or medium on which data is stored. For example, this metadata may include the date last accessed, the date of last change, the location of storage, the type of medium, etc. However, the metadata may also provide information relating to the data that is stored on the removable storage device or medium. This type of metadata may include an index of files, a file list, a system which has stored data to the medium or device, the last access of each individual file, the last change of each individual file, owner, date created, file type, etc.

According to one embodiment, the processor may also be for outputting metadata associated with other removable storage devices or other removable storage media that are similar to the removable storage device or the removable storage medium that corresponds to the identifier. For example, if the identifier points to a tape cartridge from building 6 of company XYZ's San Francisco location, then the processor may also output metadata from other tape cartridges that have data from building 6 stored thereon, from the San Francisco location stored thereon, from company XYZ stored thereon, etc. In this way, only the identifier for a single removable storage medium and/or removable storage device is required in order to access metadata from multiple removable storage media and/or removable storage devices, which can be output from the system.

In a preferred embodiment, the removable storage device may be a magnetic tape cartridge which includes magnetic tape having data stored thereon. The magnetic tape cartridge is preferably readable by a magnetic tape drive.

Figure 4:
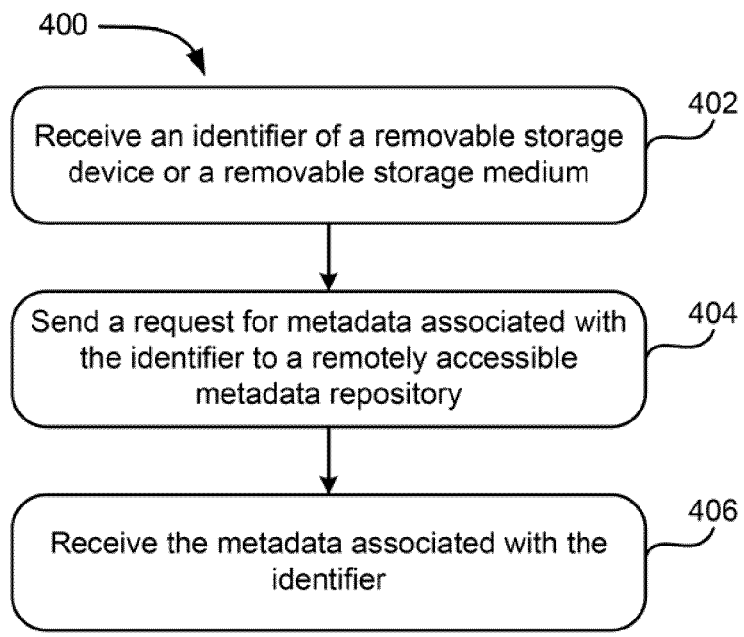
FIG. 4 is a flowchart of a method, according to one embodiment.

Now referring to FIG. 4, according to some embodiments, a method 400 for managing removable media is shown. The method 400 may be performed in any desired environment, and may include more operations than those described below. In addition, the method 400 may be executed by a computer system, network device, etc.

In operation 402, an identifier of a removable storage device or a removable storage medium is received.

In operation 404, a request is sent for metadata associated with the identifier to a remotely accessible metadata repository.

In operation 406, the metadata associated with the identifier is received. The metadata corresponds to data on the removable storage device or data on the removable storage medium. In some further approaches, the metadata may also correspond to the removable storage device or the removable storage medium.

In a preferred embodiment, the removable storage device may be a magnetic tape cartridge which includes magnetic tape having data stored thereon. The magnetic tape cartridge is preferably readable by a magnetic tape drive. In a further embodiment, the identifier may be stored on or coupled to a magnetic tape, and the magnetic tape may be a part of the magnetic tape cartridge.

In some further embodiments, the method 400 may further include retrieving a pointer from the magnetic tape or the magnetic tape cartridge, the pointer pointing to the metadata stored on the remotely accessible metadata repository. In one approach, the pointer may be retrieved from a CM of the magnetic tape cartridge. In more approaches, the pointer may comprise a uniform resource locator (URL) or a network address. For example, the pointer may be a URL which when accessed, provides a link to the metadata corresponding to the data on the magnetic tape of the magnetic tape cartridge, thereby allowing direct remote access to the metadata without needing the tape cartridge to be possessed by the user accessing the URL.

In one embodiment, a magnetic tape cartridge includes a magnetic tape for storing data, data stored to the magnetic tape, and an identifier stored on or coupled to the magnetic tape, wherein the identifier is associated with metadata stored in a metadata repository which corresponds to the data stored to the magnetic tape. Of course, if data is not stored to the magnetic tape, there is no need for an identifier, since there is no data for which to create metadata. However, even in these cases, each tape cartridge may still have an identifier, so as to provide a user the information that no metadata exists for that tape cartridge.

In a preferred embodiment, the magnetic tape cartridge further includes a CM, and the identifier is stored on the CM of the magnetic tape cartridge.

According to additional embodiments, the methods and systems described herein may be used with a linear tape file system (LTFS) or the like. In the case of LTFS, an index may be written to the tape which has some or all the standard information in a file system's index table, e.g. file name, file length, file dates (when the file is created, when the file is changed, etc.), etc. Thus, a LTFS Index in one embodiment is metadata corresponding to the data on a tape cartridge. When using the methods and systems described herein with LTFS, when a new cartridge is written with files, a LTFS Index may be stored to the tape cartridge in the Index Partition. Also, when an unload of that cartridge is requested, that LTFS Index can then be written to a remote iRMM instance which also might be storing other information about that cartridge (e.g. usage statistics, information about any errors seen, etc.). In addition, iRMM's copy of the LTFS Index represents a second, cached version of the LTFS Index, e.g. the master version of the metadata is on the LTFS written tape cartridge. The version of the metadata that is in iRMM may be treated as a read-cached version of the Index written to the tape cartridge, in one approach. Once a second copy of the LTFS Index has been stored to iRMM, network accessibility may be provided to that Index. Further, when an Index is read from iRMM, it may be read by another instance of LTFS which is trying to present an updated list of the files contained on that tape cartridge. That list is potentially updated from the last time that instance of LTFS mounted that tape cartridge (if it ever did). Accordingly, one benefit of using some of the methods and systems described herein with LTFS is that a centralized index repository is provided so that a search (e.g. for a file of a certain name, a file with some attribute, etc.) can be performed by any instance of LTFS across all indexes seen by all instances of LTFS connected to iRMM.

Note that iRMM may be used as a write cache as well, e.g. updates to that Index may be stored to iRMM and all actual updates of the index on the media itself may be deferred and used to update (e.g., overwrite) the index file on the media itself. In this case, the iRMM instance of the file index may be a master copy, and the copy on the tape is potentially out-of-date, but not necessarily so. There are non-LTFS usages as well, but essentially iRMM is providing the same value, e.g. a database which can be searched, containing metadata about the data on a cartridge, in some embodiments.

Figure 5:
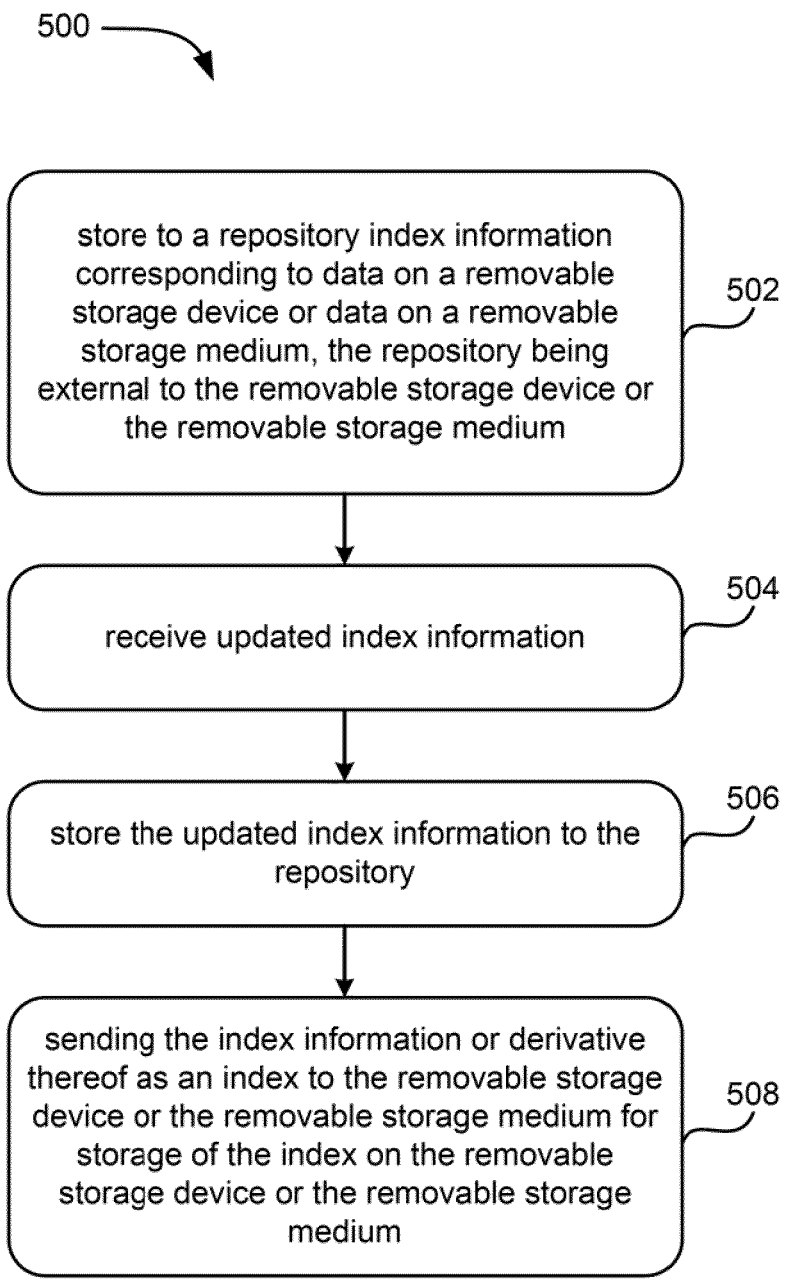
FIG. 5 is a flowchart of a method, according to one embodiment.

In one illustrative embodiment, a method 500 for write caching index information is shown in FIG. 5. The method 400 may be performed in any desired environment, and may include more operations than those described below. In addition, the method 400 may be executed by a computer system, network device, etc.

Referring to FIG. 5, in operation 502, index information corresponding to data on a removable storage device or data on a removable storage medium is stored to a repository such as iRMM, a database, etc. The index information may include traditional index information as described elsewhere herein. The index information may also include metadata corresponding to the data on the removable storage device or the data on the removable storage medium. The repository is external to the removable storage device or the removable storage medium. Updated index information is received in operation 504 and stored to the repository in operation 506. For example, the updated index information may be generated as a result of data being written to the removable storage medium or device, may include an updated pointer or access information, etc.

In operation 508. the index information (including updated index information) or derivative thereof is sent as an index, e.g., index file, to the removable storage device or the removable storage medium for storage of the index thereon. If the index information includes metadata, the index may be generated from the metadata.

Preferably, updating of the index on the removable storage device or the removable storage medium is deferred for a period of time after receiving the updated index information, and not sent until after the period of time, the index including the updated index information or derivative thereof. The period of time does not need to be some predetermined amount of time, but rather may refer to a condition or occurrence of an event that triggers writing of the updated index to the removable storage medium or device. For example, the updates to the index information may be cached in the repository until the system receives an indication that the medium is to be mounted anyway (e.g. opportunistically), and then the updated index is written to the media. In another approach, the media or device is about to be removed from the system or tape automation it is coupled to (in which case a mount may optionally be forced to allow the updated index to be written to the media). In yet another approach, it may be possible to update the index written to the media (e.g. tape cartridge) without actually mounting it in the device (e.g. tape drive). This might be the case if the index was typically stored in a silicon memory in the cartridge which can be accessed wirelessly, such as the cartridge memory (CM) of an LTO tape cartridge. In that case the index could be updated by writing the updated index to that wireless silicon memory, which can potentially be done without mounting the cartridge (e.g. by a CM writer/reader which is attached to some part of an automated tape library other than the in the tape drive, such as on the picker, or in the import/export slot). In another approach, the updated index may be sent to the medium or device at the end of the day.

In more approaches, a user such as a remote business partner may (if the partner has access permissions) network into iRMM and see all of the files on each tape cartridge the partner has access to (with the access permissions) and determine which tape cartridge(s) should be sent to the partner from a storage facility. When those cartridges are received, one or more files on the cartridge may be edited, which updates the index written to the cartridge itself. The updated index may then be sent back to iRMM. After that, any user that can network into iRMM with sufficient access privileges may view the changes made to that tape cartridge (to the extent those changes are visible via the index), even as the tape cartridge is in transit from the business partner back to the storage facility.

In another approach, a URL may be used to reference and provide access to a location of the metadata. By storing a URL to the tape cartridge, e.g., on the tape, in CM, etc., if a user has physical access to the tape cartridge, the user may be able to network into the iRMM database (e.g. to post updates to the index). Note that having a given URL may only gain a user access to that one index file, something the user would have anyway if the tape cartridge is in the user's possession (i.e. the index file may also be stored on the tape cartridge, and so could be read directly from the tape cartridge without networking). One benefit afforded by such embodiments is in providing a way to easily and efficiently connect to the remote location to post any updates to that index.

Furthermore, the URL may have a random extension which provides additional security, e.g. if the random extension is sufficiently long, it is not something someone could guess within a reasonable period of time. In this case, there may be too many possible permutations to explore to arrive at the correct random extension (e.g., it may be like attempting to guess a 128-bit encryption key). The foregoing is premised on a user not being able to see anything unless the user has the full URL. If a user could network in to part of the URL (e.g. all but the last field with the random number) and do a search on all files or folders associated with that tape cartridge, the user may then potentially see all the options available and then try each one to arrive at the proper extension. Thus, use of a partial URL may be blocked in some embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving metadata describing a removable storage medium and data stored on the removable storage medium, wherein the data is only accessible when the removable storage medium is mounted;

storing the metadata to a metadata repository that is external to the removable storage medium;

associating an identifier with the metadata, the identifier corresponding to the removable storage medium;

storing the identifier to the metadata repository; and storing, to the removable storage medium, a pointer and/or link to a storage location of the metadata in the metadata repository, wherein the identifier comprises at least one of: a value in a bar code coupled to an exterior of a cassette of the removable storage medium, a value in a radio frequency identification (RFID) tag coupled to the cassette of the removable storage medium, and a code coupled to an exterior of the cassette of the removable storage medium, and wherein the metadata describing the removable storage medium comprises:

date of last access for the removable storage medium, date of last change to the removable storage medium, a type of medium for the removable storage medium, and identification of all systems which have stored data to the removable storage medium, and wherein the metadata describing data stored on the removable storage medium comprises:

an index of files stored to the removable storage medium, owner of each file stored on the removable storage medium, date of creation of each file stored on the removable storage medium, file type of each file stored on the removable storage medium, date of last change of each file stored on the removable storage medium, and date of last access of each file stored on the removable storage medium.

2. The method as recited in claim 1, wherein the identifier is obtained from a scanning device comprising at least one of: a radio frequency (RF) scanner, an optical scanner, and a bar code scanner, and wherein the identifier comprises a uniform resource locator (URL) or a network address that points to the storage location of the metadata in the metadata repository.

3. The method as recited in claim 1, wherein the metadata repository includes an iRMM database.

4. The method as recited in claim 1, wherein the identifier includes the code, wherein the code includes a location identifier along with a number of the removable storage medium.

5. The method as recited in claim 1, wherein the pointer and/or link to the storage location of the metadata in the metadata repository comprises a uniform resource locator (URL) or a network address that points to the storage location of the metadata in the metadata repository, and wherein the pointer and/or link to the storage location of the metadata in the metadata repository is stored in a cartridge memory (CM) of the removable storage medium.

6. The method as recited in claim 1, further comprising verifying that the identifier is unique and not assigned to another removable storage medium before associating the identifier to the metadata and storing the identifier to the metadata repository.

7. The method as recited in claim 1, further comprising:
receiving updated metadata;
storing the updated metadata to the metadata repository; and
sending the updated metadata or derivative thereof as an index to the removable storage medium for storage of the updated metadata or derivative thereof to the removable storage medium,
wherein sending the updated metadata or derivative thereof is deferred for a period of time after receiving the updated metadata, and not sent to the removable storage medium, until after the period of time has elapsed as indicated by occurrence of an event, the event being selected from a group consisting of:
receiving an indication that the removable storage medium is being mounted;
receiving indication that the removable storage medium is about to be removed from a system or tape automation it is coupled to; and
a predetermined time of day being reached.

8. The method as recited in claim 1, further comprising accessing the storage location of the metadata in the metadata repository to determine which data is stored on the removable storage medium without mounting the removable storage medium.

9. A computer program product, comprising:
a non-transitory computer readable storage medium having computer readable program code embodied therewith, the computer readable program code comprising:
computer readable program code configured to receive metadata describing a removable storage medium and data stored on the removable storage medium, wherein the data is only accessible when the removable storage medium is mounted;
computer readable program code configured to store the metadata to a metadata repository;
computer readable program code configured to associate an identifier with the metadata, the identifier corresponding to the removable storage medium;
computer readable program code configured to store the identifier to the metadata repository; and
computer readable program code configured to store, to the removable storage medium, a uniform resource locator (URL) that points to a storage location of the metadata in the metadata repository,
wherein the metadata describing the removable storage medium comprises: date of last access for the removable storage medium, date of last change to the removable storage medium, a type of medium for the removable storage medium, and identification of all systems which have stored data to the removable storage medium, and
wherein the metadata describing data stored on the removable storage medium comprises: an index of files stored to the removable storage medium, owner of each file stored on the removable storage medium, date of creation of each file stored on the removable storage medium, file type of each file stored on the removable storage medium, date of last change of each file stored on the removable storage medium, and date of last access of each file stored on the removable storage medium.

10. The computer program product as recited in claim 9, wherein the identifier comprises at least one of: a value in a bar code coupled to an exterior of the removable storage medium, a value in a radio frequency identification (RFID) tag coupled to a cassette of the removable storage medium, and a code coupled to an exterior of the cassette of the removable storage medium, and wherein the URL is stored in a cartridge memory (CM) of the removable storage medium.

11. A system, comprising:
a scanning device for obtaining an identifier from a a removable storage medium without loading the removable storage medium;
a processor for:
receiving a request for metadata associated with the identifier, the metadata describing data stored on the removable storage medium, wherein the identifier corresponds to the removable storage medium, wherein the metadata describing data stored on the removable storage medium comprises: an index of files stored to the removable storage medium, date of last change of each file stored on the removable storage medium, and date of last access of each file stored on the removable storage medium;
accessing a metadata repository;
accessing the metadata stored to the metadata repository associated with the identifier, the identifier comprising a uniform resource locator (URL) that points to a storage location of the metadata in the metadata repository;
outputting the metadata associated with the identifier; and
outputting metadata associated with other removable storage media that are similar to the removable storage medium that corresponds to the identifier due to shared characteristics of the other removable storage media with the removable storage medium that corresponds to the identifier, the shared characteristics comprising: an owner of the data stored to the other removable storage media and the removable storage medium, and a physical location of the data stored to the other removable storage media and the removable storage medium.

12. The system as recited in claim 11, wherein the metadata also corresponds to the removable storage medium, wherein the metadata describing the removable storage medium comprises:
date of last access for the removable storage medium,
date of last change to the removable storage medium, a type of medium for the removable storage medium, and
identification of all systems which have stored data to the
removable storage medium, and
wherein the metadata describing data stored on the removable storage medium further comprises:
owner of each file stored on the removable storage medium,
date of creation of each file stored on the removable storage medium, and
file type of each file stored on the removable storage medium.

13. The system as recited in claim 11, wherein the request is received from the scanning device, and wherein the scanning device comprises at least one of: a radio frequency (RF) scanner and a bar code scanner.

14. The system as recited in claim 11, wherein the removable storage medium is housed in a magnetic tape cartridge, and wherein the URL that points to the storage location of the metadata in the metadata repository is stored in a cartridge memory (CM) of the magnetic tape cartridge.

15. A method, comprising:
receiving an identifier of a removable storage medium, wherein the identifier is obtained by a scanning device comprising at least one of: a radio frequency (RF) scanner and a bar code scanner;
sending a request for metadata associated with the identifier to a remotely accessible metadata repository; and
receiving the metadata associated with the identifier,
wherein the identifier comprises a uniform resource locator (URL) that points to a storage location of metadata in the metadata repository,
wherein the metadata describes the removable storage medium and data stored on the removable storage medium,
wherein the metadata describing the removable storage medium comprises: date of last access for the removable storage medium, date of last change to the removable storage medium, a type of medium for the removable storage medium, identification of all systems which have stored data to the removable storage medium,
wherein the metadata describing data stored on the removable storage medium comprises: an index of files stored to the removable storage medium, owner of each file stored on the removable storage medium, date of creation of each file stored on the removable storage medium, file type of each file stored on the removable storage medium, date of last change of each file stored on the removable storage medium, and date of last access of each file stored on the removable storage medium.

16. The method as recited in claim 15, further comprising receiving metadata associated with other removable storage media that are similar to the removable storage medium that corresponds to the identifier due to shared characteristics of the other removable storage media with the removable storage medium that corresponds to the identifier, the shared characteristics comprising: an owner of the data stored to the other removable storage media and the removable storage medium, and a physical location of the data stored to the other removable storage media and the removable storage medium.

17. The method as recited in claim 15, wherein the removable storage medium is housed in a magnetic tape cartridge, and wherein the URL that points to the storage location of metadata in the metadata repository is stored in a cartridge memory (CM) of the magnetic tape cartridge.

18. The method as recited in claim 15, wherein the identifier is stored in at least one of: a code coupled to an exterior of the removable storage medium, a value in a bar code coupled to a cassette of the removable storage medium, and a value in a radio frequency identification (RFID) tag coupled to the cassette of the removable storage medium.

19. The method as recited in claim 15, further comprising retrieving a pointer from data on the removable storage medium, the pointer pointing to the metadata stored on the remotely accessible metadata repository.

20. A magnetic tape cartridge, comprising:
a magnetic tape for storing data;
data stored to the magnetic tape; and
an identifier comprising at least one of: an alphanumeric code coupled to an exterior of the magnetic tape cartridge, a value in a bar code coupled to an exterior of the magnetic tape cartridge, and a value in a radio frequency identification (RFID) tag coupled to the magnetic tape cartridge, wherein the identifier is associated with metadata stored in a metadata repository which describes the magnetic tape and the data stored to the magnetic tape,
wherein the data is only accessible when the magnetic tape cartridge is mounted,
wherein a uniform resource locator (URL) of a storage location of the metadata in the metadata repository is stored to the magnetic tape,
wherein the metadata describing the magnetic tape comprises: date of last access for the magnetic tape, date of last change to the magnetic tape, a type of medium for the magnetic tape, identification of all systems which have stored data to the magnetic tape, and
wherein the metadata describing the data stored on the magnetic tape comprises: an index of files stored to the magnetic tape, changes to the data, owner of each file stored on the magnetic tape, date of creation of each file stored on the magnetic tape, file type of each file stored on the magnetic tape, date of last change of each file stored on the magnetic tape, and date of last access of each file stored on the magnetic tape.

21. The magnetic tape cartridge as recited in claim 20, further comprising a cartridge memory (CM), wherein an electronic version of the identifier is stored in the CM of the magnetic tape cartridge as the URL or a network address that points to the storage location of the metadata in the metadata repository.

22. A method, comprising:
storing, to a repository, index information corresponding to data on a removable storage medium, the repository being external to the removable storage medium;
receiving updated index information;
storing the updated index information to the repository; and
sending the updated index information or derivative thereof as an index to the removable storage medium for storage of the index on the removable storage medium,
wherein sending the updated index information or derivative thereof is deferred for a period of time after receiving the updated index information, and not sent to the removable storage medium, until after the period of time has elapsed as indicated by occurrence of an event, the event being selected from a group consisting of:
receiving an indication that the removable storage medium is being mounted;
receiving indication that the removable storage medium is about to be removed from a system or tape automation it is coupled to; and
a predetermined time of day being reached.

23. The method as recited in claim 22, further comprising generating the index from metadata describing the removable storage medium and the data on the removable storage medium, the metadata being included in the updated index information, wherein the metadata describing the removable storage medium comprises: date of last access for the removable storage medium, date of last change to the removable storage medium, a type of medium for the removable storage medium, identification of all systems which have stored data to the removable storage medium, and wherein the metadata describing the data on the removable storage medium comprises: an index of files stored to the removable storage medium, owner of each file stored on the removable storage medium, date of creation of each file stored on the removable storage medium, file type of each file stored on the removable storage medium, date of last change of each file stored on the removable storage medium, and date of last access of each file stored on the removable storage medium.

24. The method as recited in claim 22, wherein the index is sent to the removable storage medium after the period of time, the index including the updated index information or derivative thereof, and wherein the predetermined time of day being reached is an end of day.

* * * * *